United States Patent [19]

Tölle et al.

[11] Patent Number: 4,879,785
[45] Date of Patent: Nov. 14, 1989

[54] SWIVEL BEARING FOR A DOOR-HOLDING ROD FOR A DOOR-HOLDING DEVICE FOR MOTOR VEHICLES

[75] Inventors: Karl-Heinz Tölle; Heinz-Walter Heinemann, both of Wuppertal; Jürgen Brockhaus, Remscheid; Wolfgang Fiebrich, Halver, all of Fed. Rep. of Germany

[73] Assignee: ED. Scharwächter GmbH & Co. KG, Remscheid, Fed. Rep. of Germany

[21] Appl. No.: 220,017

[22] Filed: Jul. 15, 1988

[30] Foreign Application Priority Data

Jul. 15, 1987 [DE] Fed. Rep. of Germany ....... 3723424

[51] Int. Cl.⁴ .......................... E05C 17/04; E05D 5/10
[52] U.S. Cl. ........................................ 16/82; 16/380; 16/381; 16/386
[58] Field of Search ............. 16/82, 86 R, 86 A, 228, 16/273, 340, 343, 345, 346, 347, 380, 381, 386; 292/275

[56] References Cited

U.S. PATENT DOCUMENTS

| 2,520,571 | 8/1950 | Sjobring | 16/340 X |
| 2,715,746 | 8/1955 | Travis | 292/275 X |
| 3,474,470 | 10/1969 | Watson | 16/337 X |
| 4,542,558 | 9/1985 | Brockhaus | 16/380 |
| 4,720,198 | 1/1988 | DeBruyn | 16/273 X |

FOREIGN PATENT DOCUMENTS

| 1139705 | 2/1957 | France | 16/82 |
| 1340951 | 9/1963 | France | 16/386 |
| 21793 | of 1900 | United Kingdom | 16/381 |

Primary Examiner—Nicholas P. Godici
Assistant Examiner—William Scott Andes
Attorney, Agent, or Firm—Toren, McGeady & Associates

[57] ABSTRACT

A door-holding device for vehicle doors includes a door-holding rod which is swivelably attached to a structural door component. The door-holding rod extends with its other end through a holder housing mounted on another structural door component. The door-holding rod has along its length increased thickness portions which protrude outwardly transversely of the longitudinal direction of the door-holding rod. The door-holding rod is freely swivelably mounted on a carrier member with a clinch bolt or screw bolt. The carrier member is attached to one of the structural door components. A spring load is applied to the door-holding rod in axial direction of the swivel bearing of the door-holding rod. The spring rests against a head of the bolt. The bolt is mounted secured against rotation in an opening of the carrier member. The door-holding rod is supported by a conical clutch-type, axially and radially acting members on a shaft portion having smooth running surfaces of the bolt forming the axis of the swivel bearing, wherein the clutch type members provide a support which is automatically centering and free of play.

13 Claims, 4 Drawing Sheets

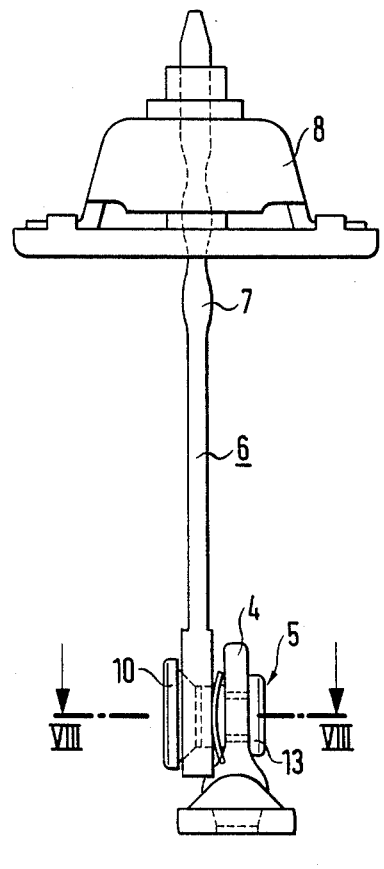
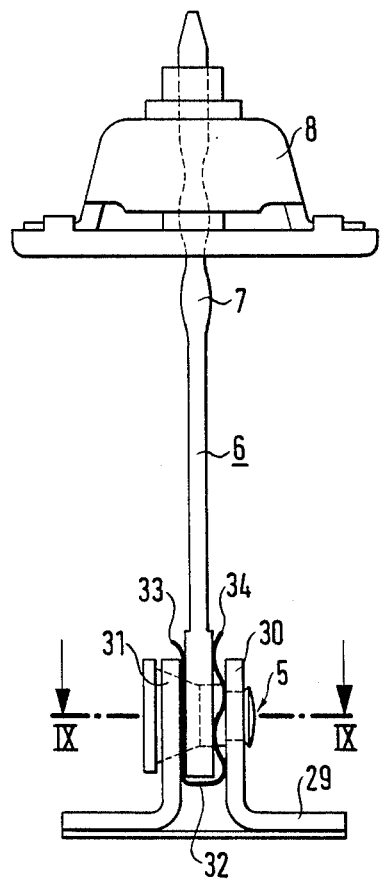
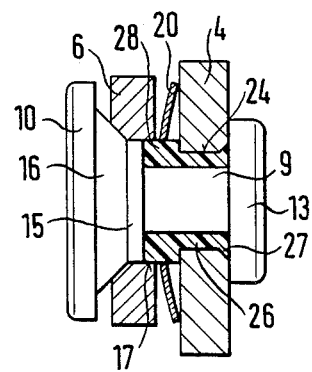
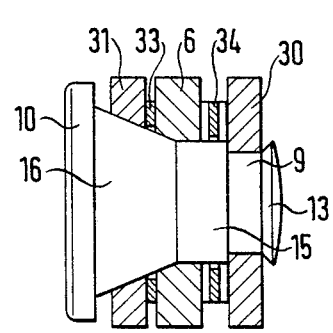

Fig. 10
Fig. 12
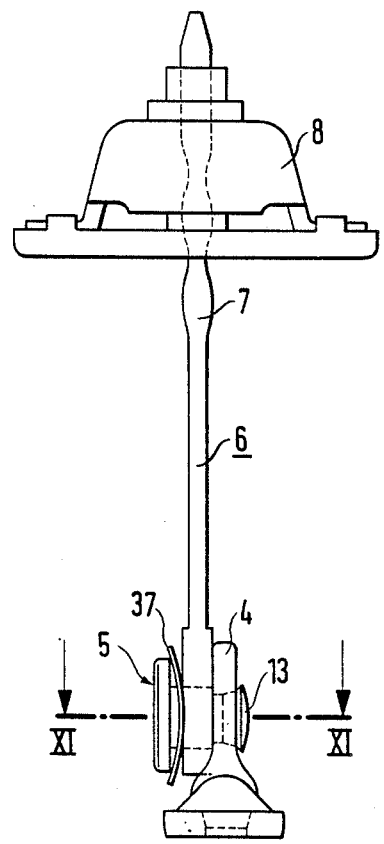
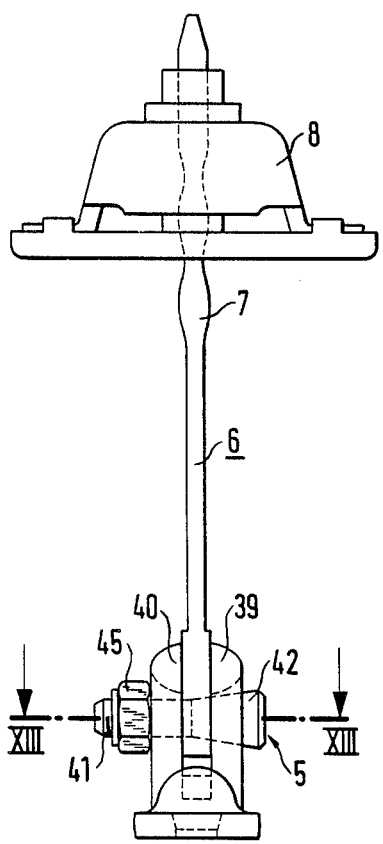
Fig. 11
Fig. 13
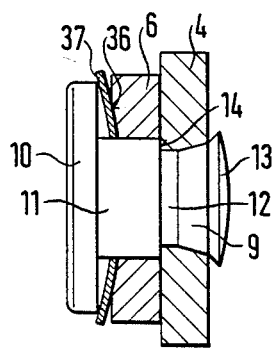
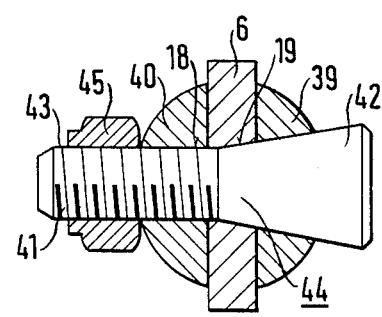

SWIVEL BEARING FOR A DOOR-HOLDING ROD FOR A DOOR-HOLDING DEVICE FOR MOTOR VEHICLES

BACKGROUND OF THE INVENTION

1. Field of the Invention

The present invention relates to a door-holding device, particularly for vehicle doors. The door-holding device includes a door-holding rod which is swivelably attached to a structural door component, a door or a door post. The door holding rod extends with its other end through a holder housing mounted on another structural door component or the like. The door-holding rod has along its length increased thickness portions which protrude outwardly transversely of the longitudinal direction of the door-holding rod. The door-holding rod is freely swivelably mounted on a carrier member by means of a clinch bolt or a screw bolt. The carrier member is formed by a single shaped piece and is attached to one of the structural door components. A spring load is applied to the door holding rod in axial direction of the swivel bearing of the door holding rod, wherein the spring rests against the head of the clinch bolt or the screw bolt. The clinch bolt or screw bolt is mounted secured against rotation in an opening of the carrier member.

2. Description of the Related Art

In pending application Ser. No. 039,536, it is proposed for obtaining a play-free engagement of the door-holding rod with the clinch bolt or screw bolt forming the swivel bearing axis of the swivel bearing, to provide one of the two interacting bearing surfaces with a surface profiling is provided either on the surface of the opening of the door holding rod or on the bearing surface of the clinch or screw bolt interacting with the opening of the door-holding rod. The latter is preferred because it is easier to manufacture.

The measure suggested in the pending application is certainly suitable for providing a swivel bearing which is free of play. However, swivel bearings for door-holding rods of door-holding devices for motor vehicle doors pose a particular problem because very high peak forces occur during the operation of the door-holding device when the vehicle doors are opened and closed. These peak forces must be absorbed in the swivel bearing of a door-holding strip. These forces result in a substantial wear of the bearing surfaces and, thus, of the surface profiling provided on the bearing surface. Accordingly, after operation of the door-holding device over a long period of time, it can no longer be ensured that the swivel bearing of the door-holding rod is free of play. On the other hand, even a very small play in the swivel bearing of the door-holding rod leads to substantial clicking or creaking noises. These noises are particularly audible because the structural door components and particularly the door act as a resonant body.

It is, therefore, the primary object of the present invention to improve a door-holding device of the above-described type. Specifically, while keeping the components of the device of simple construction, the occurrence of a play between the opening of the door-holding rod and the shaft portion of the clinch bolt or screw bolt forming the swivel bearing is to be avoided. In addition, means which become effective automatically or can be actuated are to be provided for keeping the swivel bearing of the door-holding rod free of play even over long periods of operation of the door-holding device.

SUMMARY OF THE INVENTION

In accordance with the present invention, the door-holding rod is supported by means of conical clutch-type, axially and radially acting means on a shaft portion have smooth running surfaces of the clinch bolt or screw bolt forming the axis of the swivel bearing, wherein the means provide a support which is automatically centering and free of play.

The axially and radially acting means may be particularly formed by conically widening portions provided alternatingly on the opening of the door-holding rod and on the shaft portion of the clinch bolt or the screw bolt. Together with the arrangement of a spring acting in axial direction of the swivel bearing of the door-holding rod, this ensures that the swivel bearing remains automatically free of play even over long periods of operation of the door-holding device.

In conjunction with the arrangement of a spring acting coaxially with the shaft of the clinch bolt or screw bolt, the length of the conical widening of the opening of the door-holding rod is advantageously smaller than the maximum deflection of the spring, so that the conical widening of the opening is continuously in contact with the conical widening of the clinch bolt or screw bolt even after wear has occurred. As a result, any play in the swivel bearing of the door-holding rod is automatically eliminated.

The conical widening of the shaft portion of the clinch bolt or the screw bolt is advantageously arranged immediately adjacent the head of the clinch bolt or screw bolt and has a greater length in axial direction than the corresponding widening of the opening of the door-holding rod, so that it remains possible to readjust the swivel bearing of the door-holding rod.

The invention further provides that the spring resting against the carrier member or against a support arm of a support member acts on the side surface of the door-holding rod located opposite the conical widening of the opening. In particular, the spring may be constructed as a spring washer.

In accordance with a preferred embodiment of the invention, the shaft portion of the clinch bolt is constructed as a flanged shaft, wherein the portion of the shaft extending in longitudinal direction having the reduced diameter extends through a bushing which is temporarily riveted into the carrier member and serves to guide the spring washer. This provides the advantage that during assembly of the door-holding device, the spring washer can initially be placed on the bushing and the door-holding rod is then only connected to the carrier member through the corresponding clinch bolt forming the swivel bearing axis.

It may also be provided that the bushing forms a part of the bearing surface of the swivel bearing of the door-holding rod.

In accordance with another feature of the present invention, a screw bolt may be used instead of the clinch bolt. The screw bolt may be constructed as a flanged bolt. The screw bolt is tightened relative to the carrier member by means of a nut and may be secured against rotation in a corresponding bore of the carrier member by means of a surface profiling.

The swivel bearing of the door-holding rod may be provided in a support member having two support arms which receive the door-holding rod therebetween. In that case, the spring may be a clip spring, wherein the spring arm of the spring is arranged opposite the conical widening of the opening of the door-holding rod and is braced against one of the support arms of the support member.

In accordance with a further development of the invention, a side surface of the door-holding rod has a spherical recess arranged concentrically with the opening of the door-holding rod. An arched spring washer supported and centered at the head of the clinch bolt or screw bolt having a cylindrical shaft portion is placed in the spherical recess. Thus, the spring washer together with the spherical recess in the side surface of the door-holding rod forms the axially and radially acting, automatically centering means for keeping the swivel bearing of the door-holding rod free of play.

Finally, in accordance with another embodiment of the invention in which the swivel bearing of the door-holding rod is arranged in a support member, two support arms of the support member receiving the door-holding rod therebetween are clamped against the oppositely located side surfaces of the door-holding rod by means of a screw bolt which conically widens and is received partially in a conical widening of the opening of the door-holding rod. The screw bolt is tightened in the support arms of the support member by means of a nut and, thus, can be retightened when a play occurs in the swivel bearing of the door-holding rod. The two support arms of the support member may advantageously have a semicircular cross-sectional profile.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWING

In the drawing:

FIG. 6 is a front elevational view of another embodiment of the door-holding device for motor vehicle doors according to the present invention;

FIG. 7 is a sectional view, on a larger scale, taken along sectional line VII—VII of FIG. 6.

FIG. 8 is a front elevational view of another embodiment of the door-holding device for motor vehicle doors according to the present invention;

FIG. 9 is a sectional view, on a larger scale, taken along sectional line IX—IX of FIG. 8;

FIG. 10 is a front elevational view of another embodiment of the door-holding device for motor vehicle doors according to the present invention;

FIG. 11 is a sectional view, on a larger scale, taken along sectional line XI—XI of FIG. 10;

FIG. 12 is a front elevational view of another embodiment of the door-holding device for motor vehicle doors according to the present invention;

FIG. 13 is a sectional view, on a larger scale, taken along sectional line XIII—XIII of FIG. 12.

DETAILED DESCRIPTION OF THE INVENTION

Figure 1:
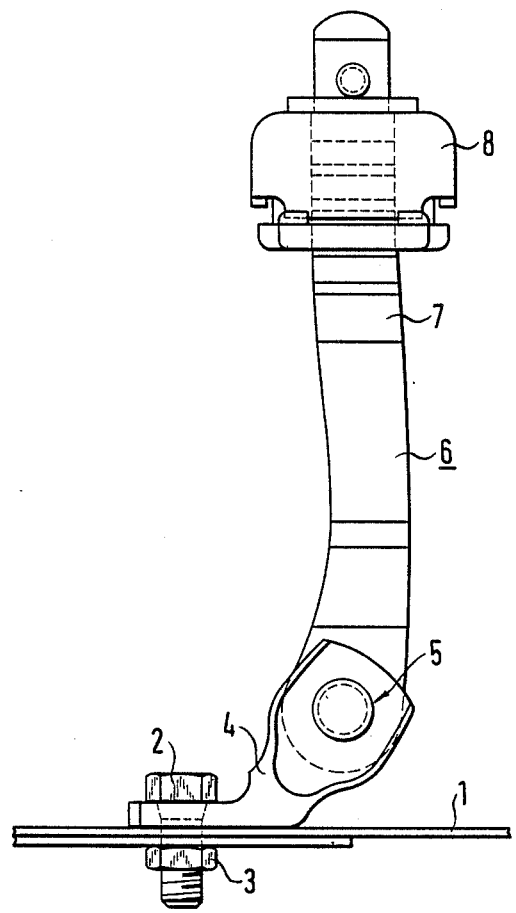
FIG. 1 is a side elevational view of a door-holding device for motor-vehicle doors according to the present invention.

As illustrated in FIG. 1 of the drawing, a carrier member 4 for the swivel bearing 5 of a door-holding rod 6 is attached to a structural door component 1 by means of a screw bolt 2 and a nut 3. The other end of door-holding rod 6 extends through a holder housing 8 which is part of a second structural door component, not shown. The door-holding rod 6 has increased thickness portions 7.

In the embodiment illustrated in FIGS. 2 and 3 and 6–11, the swivel bearing 5 includes a clinch bolt 9. Clinch bolt 9 has a head 10, a first shaft portion 11, a second shaft portion 12 and a clinched portion 13. The two shaft portions 11 and 12 of bolt 9 have different diameters. Specifically, the diameter of shaft portion 12 is smaller than the diameter of shaft portion 11. Shaft portion 12 extends through a bore in carrier member 4. Clinch bolt 9 rests with a shoulder 14 against the front side of the carrier member 4 and with portion 13 against the rear side of the carrier member 4. The shaft portion 11 of clinch bolt 9 forms the actual swivel bearing and includes a cylindrical portion 15 and a conical portion 16 adjacent the head 10. The conical portion 16 widens toward the head 10 of the clinch bolt 9. The door-holding rod 6, in turn, is provided with an opening 17. A first portion 18 of the opening 17 is cylindrical and a second portion 19 widens conically. The conically widening portion of the opening 17 of the door-holding rod 6 faces toward the head 10 of the clinch bolt and has a depth in axial direction which is smaller than the deflection of a spring 20 which acts in axial direction on the swivel bearing 5.

In the embodiment illustrated in FIGS. 2–7, spring 20 is a spring washer. The spring washer rests against the carrier member 4 and acts on the side surface of the door-holding rod 6 facing the carrier member 4 in such a way that the conical widening 19 of the opening 20 of the door-holding rod 6 is maintained in contact with the conical widening 16 of the shaft portion 11 of the clinch bolt 9.

Figure 2:
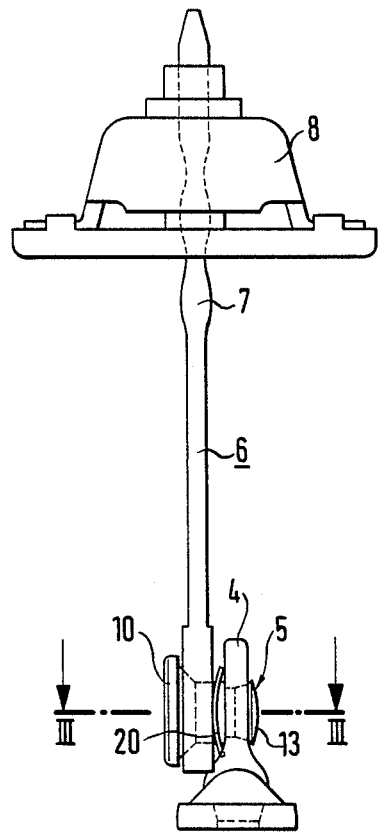
FIG. 2 is a front elevational view of the door-holding device of FIG. 1.
Figure 4:
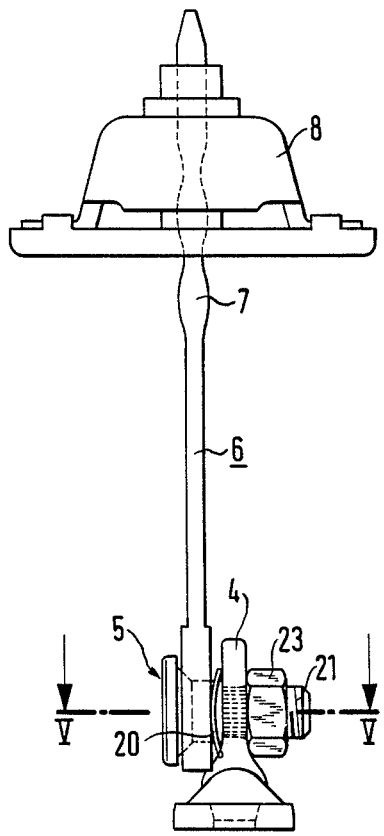
FIG. 4 is a front elevational view of another embodiment of the door-holding device for motor vehicle doors according to the present invention.
Figure 3:
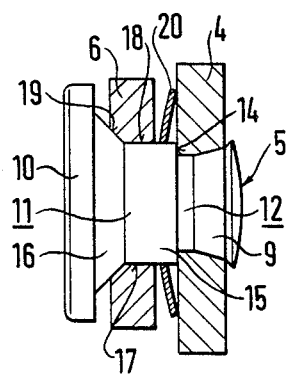
FIG. 3 is a sectional view, on a larger scale, taken along sectional line II—II of FIG. 2.
Figure 5:
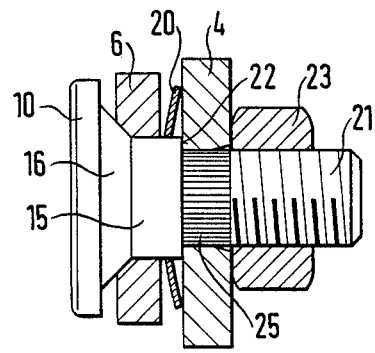
FIG. 5 is a sectional view, on a larger scale, taken along sectional line V—V of FIG. 4.

The embodiment illustrated in FIGS. 4 and 5 differs from the embodiment of FIGS. 1–3 in that a screw bolt 21 is used for the swivel bearing 5. Screw bolt 21 is a flanged bolt with a flange 22 which rests against the side of the carrier member 4 facing the door-holding rod 6 and is tightened against the opposite side by means of a nut 23. For mounting the screw bolt 21 secured against rotation in the bore 24 of the carrier member 4, the screw bolt 21 has a surface milling 25 over a portion of its length.

The embodiment of the invention illustrated in FIGS. 6 and 7 differs from the embodiment of FIGS. 1–5 in that clinch bolt 9 of swivel bearing 5 is a flanged bolt and is secured on the carrier member 4 by means of a bushing 26. The flange 28 of the bushing 26 serves as a guide for the spring 20 which is constructed as a spring washer. Thus, after the bushing 26 has been riveted to the carrier member 4, the spring 20 can be mounted first and the door-holding rod 6 is then attached by means of clinch bolts 9 to the carrier member 4. Subsequently, the clinch bolt 9 is fastened on carrier member 4 by means of a clinched portion 13 on the side of the carrier member 4 facing away from the door-holding rod 6. Thus, the bushing 26 is used to facilitate the assembly of the swivel bearing 5. As illustrated in FIG. 7, the flange 28 of bushing 26 may engage in the opening 17 of the door-holding rod 6 and may replace part of the cylindrical shaft portion 15 of the clinch bolt 9.

In the embodiment illustrated in FIGS. 8 and 9, the swivel bearing 5 of the door-holding bearing 6 is received in a support member 29. The support member 29 has two support arms 30 and 31 which receive the door-holding rod 6 therebetween. A clinched portion 13 of the clinch bolt 19 is riveted against support arm 30 of the support member 29. A conically widening shaft portion 16 of the clinch bolt 9 extends through the other support arm 31 of the support member 29 and protrudes beyond support arm 31 with its head 10. Spring 32 is constructed as a clip spring. A leg 33 of the clip spring engages between the support arm 31 of the support member 29 and the door-holding rod 6 and a spring leg 34 engages between the door-holding rod 6 and the support arm 30 of the support member 29. The spring leg 34 of the spring 32 is wave-shaped, so that it rests against the support arm 30 of the support member 29 and also acts on the side of the door-holding rod 6 which faces the support arm 30.

In the embodiment illustrated FIGS. 10 and 11, the swivel bearing 5 is again mounted on a carrier member 4, wherein clinch bolt 9 rests with a flange 14 against one side of the carrier member 4 and with a clinched portion 13 against the other side of the carrier member 4. In this embodiment, clinch bolt 9 has adjacent head 10 a smooth cylindrical shaft portion 11 which extends through the also smooth cylindrical opening 18 in the door-holding rod 6. On the side facing the head 10 of the clinch bolt 9, the door-holding rod 6 has a spherical recess 36 which is concentric with the opening 18. A spring 37 in the form of an arched spring washer is placed in the spherical recess 36 so as to supported and centered relative to head 10 of clinch bolt 9. The surface of the spherical recess 36 forms a widening portion of the opening 18 of the door-holding rod 6, while the side of the spring 37 facing the spherical recess defines a widening portion of the clinch bolt 9.

In the embodiment illustrated in FIGS. 12 and 13, the swivel bearing 5 of the door-holding rod 6 is also received in a support member 38. The door-holding rod 6 is received between the two support arms 39 and 40. The swivel bearing 5 is formed by a screw bolt 41. The screw bolt 41 has a conical head portion 42 and a cylindrical shaft portion 44 which is at least partially provided with a thread 43. Corresponding to the screw bolt 41, the opening 17 of the door-holding rod 6 has a conically widening portion 19 and an adjacent cylindrical portion 18. The screw bolt 41 is tightened by means of a nut 45 against the outer side of the support arm 40 of the support member 38 and can be re-adjusted after wear of the swivel bearing 5 has occurred.

While specific embodiments of the invention have been shown and described in detail to illustrate the application of the inventive principles, it will be understood that the invention may be embodied otherwise without departing from such principles.

We claim:

1. A door-holding device for motor vehicle doors, comprising a door-holding rod having first and second ends, a carrier member attached to a structural door component, the first end of the door-holding rod freely swivelably connected to the carrier member, the second end of the door-holding rod extending through a holder housing mounted on another structural door component door or door post, the door-holding rod having along its length increased thickness portions protruding outwardly transversely of the longitudinal direction of the door-holding rod, the door-holding rod and the carrier member defining openings, a bolt having an axis extending through the openings of the door-holding rod and of the carrier member, so that the door-holding rod is freely swivelable relative to the bolt, while the carrier member is non-rotatable relative to the bolt, the carrier member formed by a single shaped piece, the bolt having a head, a spring mounted between the head of the bolt and the carrier member, the bolt having a shaft portion with smooth running surfaces, a conical clutch-type, axially and radially acting means for supporting the door-holding rod on the smooth running surfaces of the bolt, wherein the support of the door-holding rod on the smooth running surfaces is automatically centering and free of play and wherein the axially and radially acting means include corresponding conically widening portions provided on the opening of the door-holding rod and on the shaft portion of the bolt.

2. The door-holding device according to claim 1, wherein the opening of the door-holding rod has a depth, a conically widening portions extending in axial direction over a portion of the depth of the opening of the door-holding rod.

3. The door-holding device according to claim 1, wherein the spring acts in axial direction of the bolt, the axial length of the conically widening portion of the opening of the door-holding rod being smaller than the maximum spring deflection.

4. The door-holding device according to claim 1, wherein the conically widening portion of the shaft portion of the bolt is arranged immediately adjacent the head of the bolt and has in axial direction a greater length than the widening portion of the opening of the door-holding rod.

5. The door-holding device according to claim 1, wherein the spring rests against the carrier member and acts on a side surface of the holding rod located opposite the conically widening portion of the opening of the door-holding rod.

6. The door-holding device according to claim 1, wherein a support member having a support arm is mounted on the carrier member, the spring resting against the support arm and acting on a side surface of the door-holding rod located opposite the conically widening portion of the opening of the door-holding rod.

7. The door-holding device according to claim 1, wherein the spring is a spring washer.

8. The door-holding device according to claim 7, wherein the bolt is a clinch bolt, the shaft portion of the clinch bolt being a flanged shaft, a portion of the bolt shaft having a reduced diameter portion, the reduced diameter portion extending in longitudinal direction of the bolt through a bushing, the bushing being temporarily riveted into the carrier member and serving to guide the spring washer.

9. The door-holding device according to claim 8, wherein the bolt is a screw bolt having a flange, the screw bolt being tightened relative to the carrier member by means of a nut and being secured against rotation in a corresponding bore defined in the carrier member by means of a surface profiling formed on the reduced diameter portion.

10. The door-holding device according to claim 1, comprising a support member with two support arms, the support arms receiving the door-holding rod therebetween, the spring being a clip spring having a spring arm, the spring arm being arranged opposite a conically widening potion of the door-holding rod and resting against one of the support arms of the support member.

11. The door-holding device according to claim 1, wherein a side surface of the door-holding rod defines a spherical recess arranged concentrically with the opening of the door-holding rod, an arched spring washer being placed in the spherical recess, the arched spring washer being supported and centered at the head of the bolt.

12. The door-holding device according to claim 1, comprising a support member having two support arms, the two support arms receiving the door-holding rod therebetween, the bolt being a screw bolt, the two support arms being clamped against oppositely located side surfaces of the door-holding rod by means of the screw bolt, the screw bolt having a conically widening portion and being received partially in a conically widening portion of the opening of the door-holding rod.

13. The door-holding device according to claim 12, wherein the two support arms have semicircular cross-sectional profiles.

* * * * *